(12) United States Patent  
Fisch et al.

(10) Patent No.: US 6,378,747 B1
(45) Date of Patent: Apr. 30, 2002

(54) ROOF RAIL FOR VEHICLES AND MANUFACTURING PROCESS THEREFOR

(75) Inventors: Fritz Fisch, Wuppertal; Wilfried Koch, Rauschenberg; Reinhard Drees, Wuppertal, all of (DE)

(73) Assignee: JAC Products Deutschland GmbG, Wuppertal (DE)

( * ) Notice: Subject to any disclaimer, the term of this patent is extended or adjusted under 35 U.S.C. 154(b) by 0 days.

(21) Appl. No.: 09/488,089

(22) Filed: Jan. 20, 2000

(30) Foreign Application Priority Data

Oct. 8, 1999 (DE) .......................... 199 48 476

(51) Int. Cl.$^7$ ................................ B60R 9/04
(52) U.S. Cl. .................. 224/326; 224/309; 224/325
(58) Field of Search .................. 224/328, 327, 224/309, 326, 325, 329

(56) References Cited

U.S. PATENT DOCUMENTS 5,497,924 A * 3/1996 Fisch et al. ............... 224/326
5,518,157 A * 5/1996 Evels et al. ............. 224/326 X
5,893,499 A * 4/1999 Lumpe et al. .......... 224/326 X

FOREIGN PATENT DOCUMENTS

| DE | 4004829 C2 | 2/1992 |
| DE | 4122863 A1 | 1/1993 |
| DE | 4223898 A1 | 1/1994 |
| DE | 4418528 C1 | 6/1995 |
| DE | 19528212 A1 | 2/1997 |
| DE | 19726912 A1 | 1/1999 |
| DE | 19732288 A1 | 2/1999 |
| JP | 08324690 | 6/1998 |

* cited by examiner

Primary Examiner—Stephen K. Cronin
Assistant Examiner—Maerena W. Brevard
(74) Attorney, Agent, or Firm—Harness, Dickey & Pierce, PLC

(57) ABSTRACT

A roof rail 10 for a vehicle article carrier, the roof rail consisting of a rail portion 12 and a pair of end supports 14. The end supports 14 or 14' consist of the same metallic material as the rail portion 12 and are produced from bent tubular metal pieces, which are formed into the end supports 14 or 14' by an internal high pressure forming process. The forming process does not require prior heating of the bent tubular metal pieces or the forming tool used in the forming process. The end supports (14) each have a neck portion (14a) which includes a connecting peg (16) and a clamping member (18), wherein the clamping member (18) is inserted into a longitudinal groove (20) in the connecting peg (14a) to functionally secure the neck portion to the rail portion (12).

13 Claims, 3 Drawing Sheets

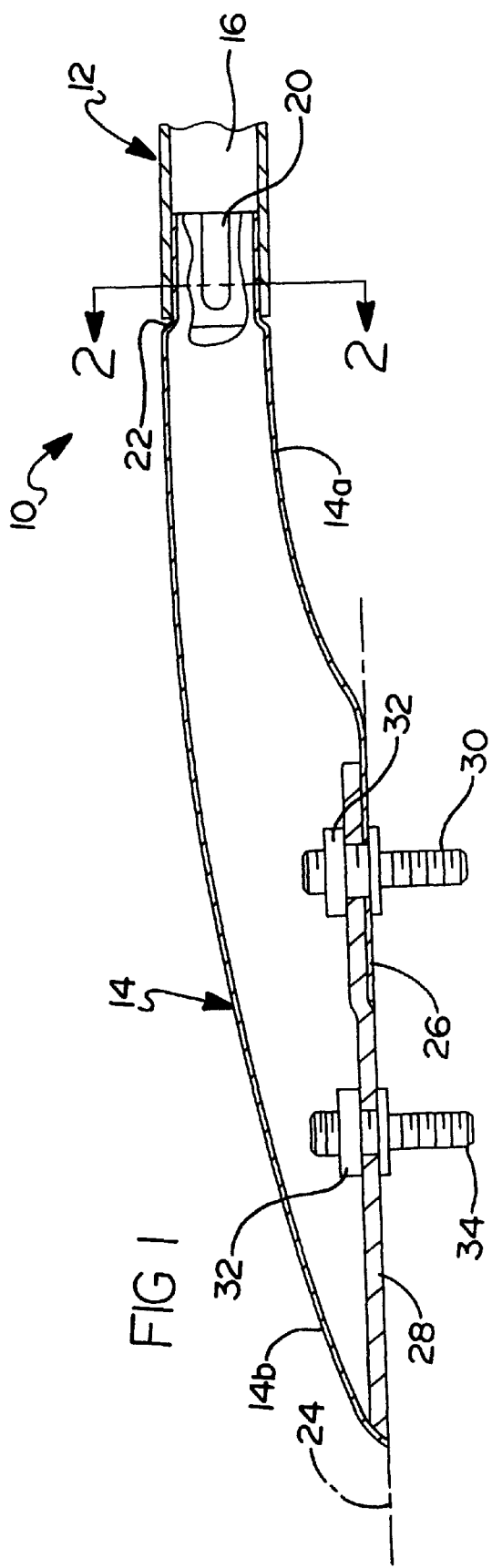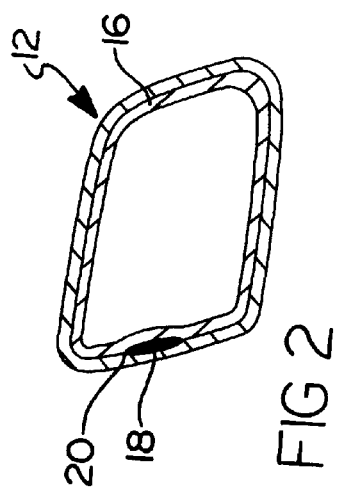

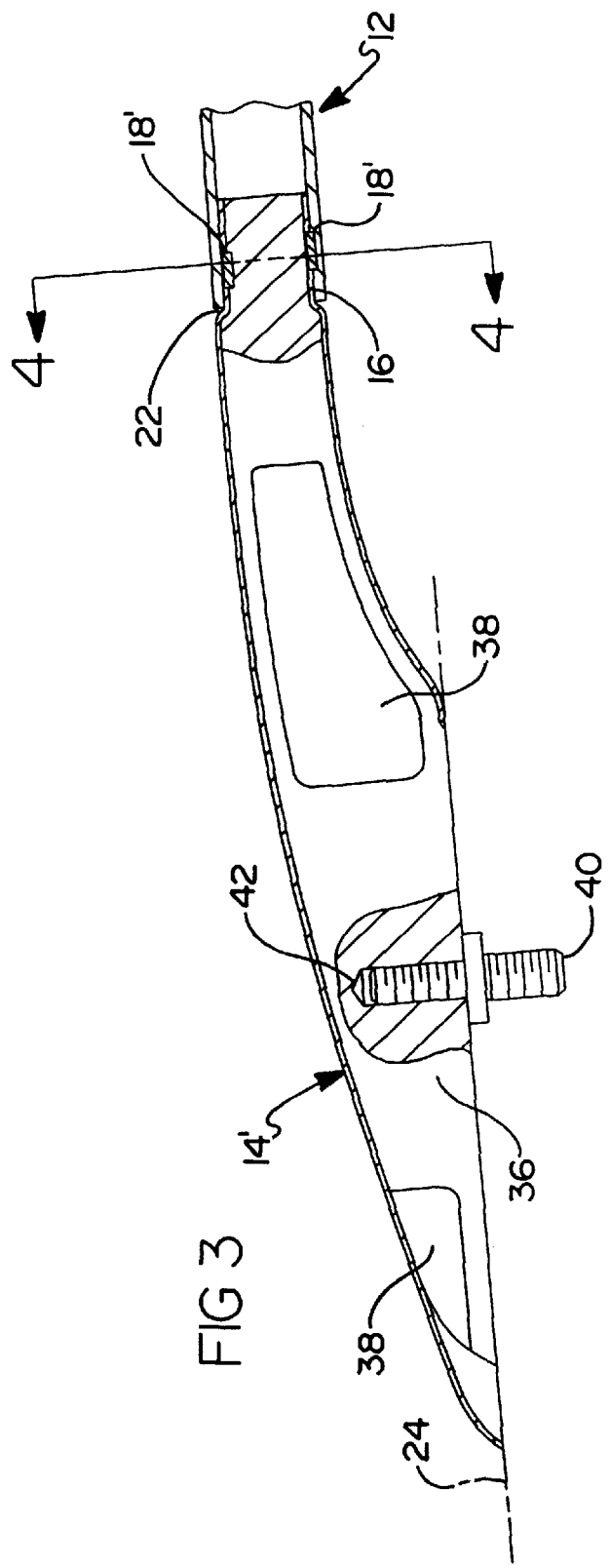
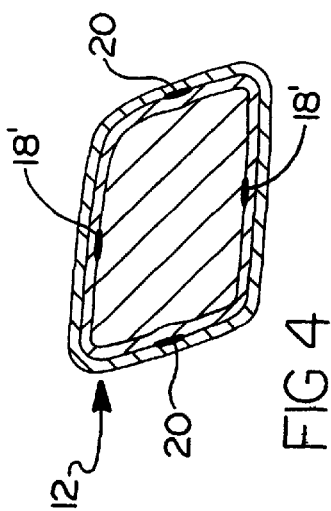

ROOF RAIL FOR VEHICLES AND MANUFACTURING PROCESS THEREFOR

TECHNICAL FIELD

This invention relates to article carriers for vehicles, and more particularly to a roof rail for a vehicle, wherein the roof rail has an elongated rail portion with an end support foot at each end, and wherein each support foot consists of one molded body having a curved shape with a first bottom end supported on the vehicle's roof and a second upper end having a connecting peg that can be guided into the end of the rail portion, and which is bordered by an annular collar on its axial length. The invention also relates to a process for manufacturing a roof rail.

BACKGROUND OF THE INVENTION

A pair of roof rails are often used to form a vehicle article carrier on an outer body surface of a vehicle. For roof rails of classical design, i.e. each consisting of end supports, center posts if necessary, and an elongated rail portion disposed between the end supports (see DE 40 04 829 C2, for example), weight savings are only conditionally possible, depending on the manufacturing process for the supports, which are generally produced by casting. However, weight savings would also be extremely desirable for the elongated rail portions.

The classical design for roof rails also has certain disadvantages regarding the optical aesthetics. A roof rail's optical aesthetics are generally determined by its surface coating. Powdered coatings are now being used rather than liquid paints. However, not all shades of color desired by customers can be accomplished with powdered coatings. Several powdered coatings are needed to accomplish a metallic effect, for example. In practice, it has been shown that several powdered coats harm the surface finish because the surface obtains an orange-skin effect as the coating thickness increases. A metallic surface structure, such as an anodized surface, can only be attained by using forged end supports. But in this case differences in color and gloss appear between the end supports and the rail portion, thus significantly detracting from the roof rail's aesthetic appearance.

DE 42 23 898 displays a roof rail in which the rail support feet and rail portion consist of a single piece. This well-known roof rail has no problems regarding either weight or surface coating. However, quite expensive, bulky, and consequently very expensive devices and tools are needed to manufacture a roof rail as one piece. Thus, roof rails of this type cannot be manufactured cost effectively unless large quantities are to be manufactured.

Proceeding from a roof rail of the type mentioned in the introduction, it is therefor a principal object of the present invention to provide a decorative roof-rail surface having a construction and finish which produce a very aesthetically appealing product.

It is another object of the present invention to provide a roof rail having a means for securing the rail portion to the rail feet in a manner to effect a very secure attachment with no visible screw elements or other fastening elements.

SUMMARY OF THE INVENTION

The above and other objects are met by a roof rail in accordance with a preferred embodiment of the present invention. The roof rail generally comprises an elongated rail portion having an end support at each end thereof. A principal advantage of the invention is that the elongated rail portion and the end supports all consist of the same basic material (steel, aluminum, aluminum alloy), whereby very highly decorative surfaces of anodizing quality can be attained. Another basic advantage of the invention can be seen in the fact that the end supports are made of simple tubular pieces and are therefore light and inexpensive.

Still another principal advantage of the present invention is the means by which the opposing ends of the rail portion are secured to the end supports. A connecting peg is included which is used in connection with a clamping element to secure an associated one of the end supports to one end of the rail portion. In one preferred form the connecting peg is adapted to be inserted into one free end of the rail portion and includes a groove formed on a surface thereof. The groove receives the clamping element and helps to wedge the end of the end support in the connecting peg. The end support can thus be held securely to its associated end of the rail portion without any external fastening elements being visible.

BRIEF DESCRIPTION OF THE DRAWINGS

The various advantages of the present invention will become apparent to one skilled in the art by reading the following specification and subjoined claims and by referencing the following drawings in which:

FIG. 1 is a vertical cross-section through an end region of the roof rail in accordance with a first preferred embodiment of the present invention;

FIG. 2 is a cross section taken in accordance with section line 2—2 in FIG. 1;

FIG. 3 is a vertical cross section through an end region of the roof rail in accordance with an alternative preferred embodiment of the present invention;

FIG. 4 is a cross section of the rail portion taken in accordance with section line 4—4 in FIG. 3;

DETAILED DESCRIPTION OF THE PREFERRED EMBODIMENTS

Figure 5:
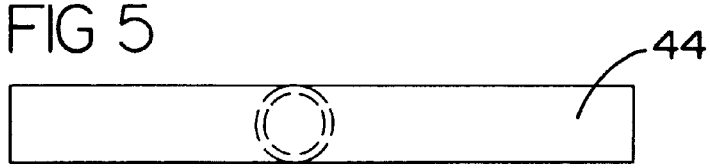
FIG. 5 is a length of tubular material provided for manufacturing an end support of the present invention.

Referring to FIG. 1, there is shown a portion of a roof rail 10 in accordance with a preferred embodiment of the present invention. The roof rail 10 includes an elongated rail portion 12 and an end support 14. The opposite end of the roof rail 10 is a mirror image of that which is shown in FIG. 1, and has therefore not been shown. A pair of roof rails 10 disposed on an outerbody surface of a vehicle generally parallel to one another form a vehicle article carrier by which articles can be supported thereon elevationally above the outer body surface.

Rail portion 12 consists of one tubular piece and may have a round or, as shown in FIG. 2, a non-circular cross section. Steel, aluminum and aluminum alloy are all materials that are particularly well suited for use as the basic material for the rail portion 12.

The end support 14 of FIG. 1 has a connecting peg or portion 16 whose exterior contour matches the internal contour of the rail portion 12. A screwed or glued joint is provided between the connecting peg 16 and the internal surface of the rail portion 12. Preferred is a connection with a frictional grip supported by a clamping element 18 (e.g., a retainer key, alignment pin, dowel pin, or the like), for which a receiving groove 20 is designed within the connecting peg 16. Advantageously, when the end support 14 is secured to the rail portion 12 no fastening elements are visible at the area where the rail portion 12 meets the end support 14.

The axial length of the connecting peg 16 is bordered by an annular collar 22 which helps to support the rail portion 12. The end support 14 is designed with a neck portion 14a which extends to the connecting peg 16. The construction of the end support disposed at the opposite end (i.e., the unillustrated end) of the roof rail 10 is identical to that shown in FIG. 1. The rail portion 12 consists of the same material as the end support 14. Except for the connecting peg 16, the end support 14 has a cross sectional diameter that steadily increases, starting from the annular collar 22 down to its bottom end 14b. The end support 14 is curved over its entire length and the bottom end 14b faces a roof 24 of the vehicle.

At its bottom end 14b the end support 14 shown in FIG. 1 has an integrally formed floor plate 26. A solid metal strip plate 28, which can be offset in the shape of steps as illustrated, is arranged to overlay a portion of the floor plate 26. This arrangement is accomplished by tightening a threaded bolt 30 which is located in a weld nut 32 connected to the strip plate 28. The threaded bolt 30 fastens the roof rail 10 onto the roof 24 in conjunction with a second threaded bolt 34, if necessary.

Referring now to FIG. 3, an end region of a roof rail 10' similar to that shown in FIG. 1 is shown. With roof rail 10', a difference can be seen in the design of the end support 14'. This end support 14' is designed to be completely independent of an insert 36 which can be fitted within a hollow internal area of the end support 14'. The insert 36 can be fastened to the end support 14' by clamping elements 18' and/or a glued joint. The insert 36, which consists of a diecast part or possibly a plastic injection-molded part, has recesses 38 which save material and weight. The insert 36 holds a threaded bolt 40 arranged within a threaded bore 42 in the insert 36 for fastening the roof rail 10' to the roof 24.

It will also be appreciated that conventional and well known support materials, such as resilient support/sealing pads (not illustrated), which can be pressed together, are preferably arranged between the end supports 14' at each end of the rail portion 12' and the roof 24 to form a seal and equalize tolerances and to protect the finish of the vehicle roof 24.

Figure 6:
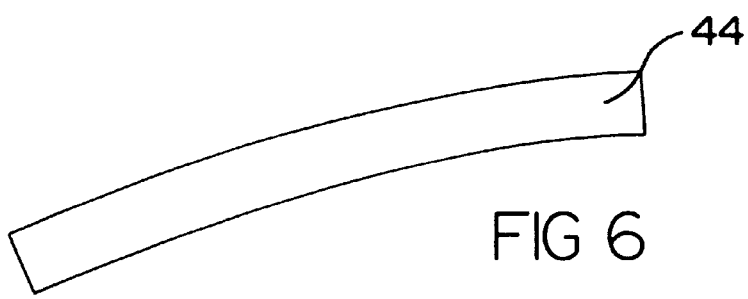
FIG. 6 is a view of the tubular length of material shown in FIG. 5 in a bent state.
Figure 8:
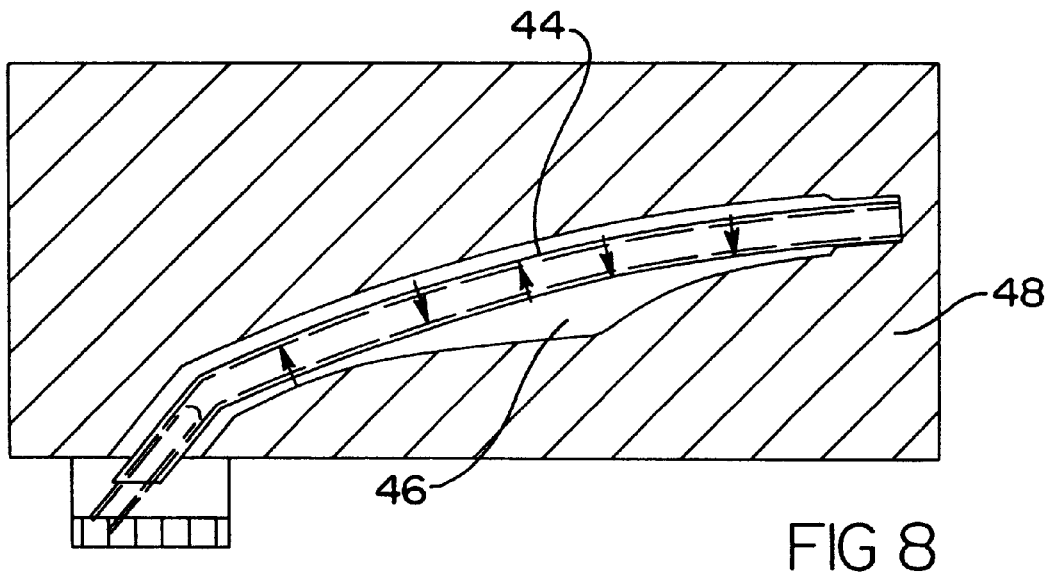
FIG. 8 is a plan view of a forming mold tool for forming the bent tubular length of material in FIG. 6 into the end support shown in FIG. 7.

As mentioned previously, each end support 14 is produced from one tubular piece of material. Such a tubular length or piece of material 44 (FIG. 5) is formed from the same basic material as that of the rail portion 12. The tubular piece 44 is first bent into a desired arc, as shown in FIG. 6, and then placed into the cavity 46 of a molding or forming tool 48, as shown in FIG. 8. The cavity 46 of the forming tool 48 corresponds to the desired final shape of the end support 14 to be manufactured, and the arc of the piece of material needs to match the arc of the cavity 46. FIG. 8 shows the cover die of the forming tool 48 in a more schematic representation. Preferably, a suitable lubricating film is applied to the tubular piece 44 and/or the cavity 46. This minimizes friction that occurs because of relative motion (i.e., a slight "pushing") between the tubular piece 44 and the cavity 46 during the forming process. Suitable lubricants include waxes, oils, paints containing graphite and various materials.

When the forming tool 48 has been closed, the ends of the tubular piece 44 are closed with axial seals. The tubular piece 44 is pressurized at one end by a pressure medium (air, oil, or water), preferably at room temperature, and a high pressure builds up inside the tubular piece 44. This pressure, which preferably is about 2,000–3,000 bar, and more preferably about 2,500 bar, causes the tubular piece 44 to expand, as indicated by the small arrows in FIG. 8. The forming process terminates as soon as the casing of the tubular piece 44 has been expanded so as to be completely urged against the walls of the cavity 46 of forming tool 48. The application of the pressurized medium is then removed, the forming tool 48 is opened and the tubular piece 44, now formed into the end support 14 or 14' in accordance with FIG. 1 or FIG. 3, is removed from the forming tool 48.

Figure 7:
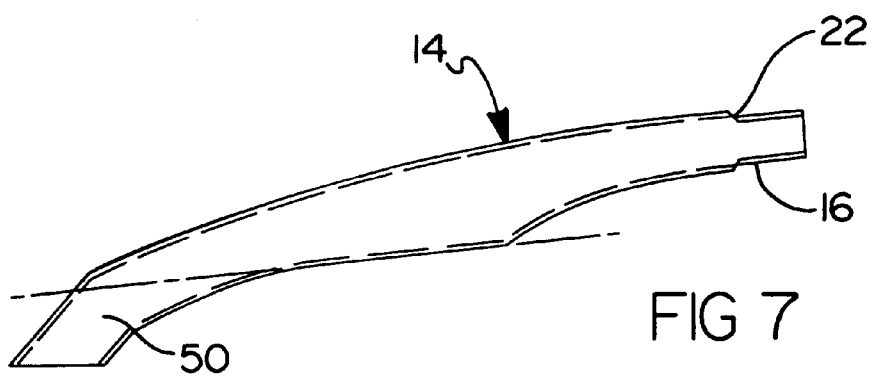
FIG. 7 is a view of the tubular length of FIG. 6 after having been formed into an end support.

Referring to FIG. 7, depending on the process, a prolongation 50 will typically remain. It can be removed along line 52 by mechanical finishing processes, and the end support 14 or 14' produced in this manner can be equipped with a fastener of the type shown in either FIG. 1 or FIG. 3, and then be attached to the rail portion 12. An anodizing or similar process can then follow, provided that the component parts of the roof rail are not handled before they are assembled. It will also be appreciated that the high pressure used to expand the tubular piece 44 will usually copy the parting line of the molding tool onto the end support 14 or 14'. This will usually require final finishing such as by grinding to remove the parting line.

When using aluminum, it will be noted that wrought aluminum alloys exhibit substantially better reforming properties in the natural-aging, soft-state, so that the required strengths are obtained by elevated temperature age hardening (such as 180° C. for eight hours). Steel and special steel are not heat-treated. A decorative, anti-corrosive surface may also be applied, and the roof rail may be equipped with seals, rubber pads and/or a center support, if desired, to aid in securing it to a vehicle.

It is preferred that the tubular piece 44 is initially formed to include at least one channel-like groove that runs along its axis and only remains in the area of the connecting peg 16 after the tubular piece 44 has been formed into the end support 14 or 14', to thus form groove 20. This measure first has the advantage of providing for the receiving groove 20 in a simple manner, and the additional advantage that more material is initially provided throughout the length of the tubular piece 44 to better facilitate expansion of the piece 44 during the above-described forming process.

For roof rails that need to be supported by a center post because of the length of the rail portion thereof, it is recommended that such a center post (not illustrated) likewise be manufactured from the same metallic material as the rail portion. The forming process described for the end support 14 or 14' can also be used for the manufacture of the center post.

It will be appreciated that tubular pieces 44 consisting of light metal have successfully been formed at room temperature (15–25° C.). The internal high pressure applied to the tubular pieces 44 is preferably between about 2,000–3,000 bar, and more preferably about 2,500 bar on the average. It will also be appreciated that the ability to form the end supports 14 or 14' without first heating the forming tool 48 or the tubular piece 44 represents a very important advantage and cost savings in the manufacturing process. The tubular pieces can be formed more quickly and with less cost because of the ability to use the forming tool 48 without first heating it or the workpiece 44.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier for supporting articles elevationally above an outer body surface of a vehicle, said vehicle article carrier comprising:
    a pair of roof rails disposed generally parallel to one another along said outer body surface, each of said roof rails including:
        an elongated, tubular rail portion;
        at least a pair of end supports adapted to be secured to said rail portion at outermost ends thereof; each said end support including a neck portion that flares outwardly to an enlarged base portion, and wherein said rail portion is formed from a single piece of material, and wherein said base portion is adapted to be secured directly to said outer body surface;
        a tubular connecting portion associated with each said end support and adapted to be inserted into said outermost end of said rail portion and further adapted to slidably receive said neck portion of one of said end supports therewithin;
        one of said rail portion or said connecting portion including a longitudinal groove;
        a clamping member insertable into said groove prior to inserting said connecting portion into said rail portion for wedgingly securing said connecting portion to one of said outermost ends of said rail portion without visible fastening elements a strip plate adapted to be secured to said outer body surface of said vehicle via a fastening element, and further adapted to engage a portion of one of said end supports to thereby secure said one end support to said outer body surface.

2. The article carrier of claim 1, wherein said connecting portion further comprises an annular collar adapted to directly abut an edge of one of said outermost ends of said rail portion.

3. The article carrier of claim 1, wherein said clamping member comprises a dowel element.

4. The article carrier of claim 1, wherein said strip plate is adapted to be disposed within an interior hollow area of said one end support; and
    wherein said one end support includes an integrally formed floor plate, wherein a portion of said strip plate overlays a portion of said floor plate such that said one end support is secured by said strip plate to said outer body surface.

5. The article carrier of claim 1 further comprising an independent insert adapted to be inserted into a hollow area within said one end support to engage interior surfaces of said one end support; and
    a fastening member adapted to secure said independent insert to said outer body surface of said vehicle.

6. The article carrier of claim 1, wherein said connecting portion of said one end support includes at least one groove formed thereon for receiving a clamping member.

7. For a vehicle article carrier adapted to support articles elevationally above an outer body surface of a vehicle, an elongated roof rail adapted to be mounted to said outer body surface, said roof rail comprising:
    a tubular, elongated rail portion having outermost terminal ends;
    a pair of end supports disposed at said outermost terminal ends;
    a pair of clamping members, one each being associated with one of said end supports;
    each of said end supports including:
        a connecting member portion adapted to be secured to one of said outermost terminal ends, and a neck portion extending from said connecting member portion and flaring outwardly to an enlarged base portion, said base portion being adapted to be secured to said outer body surface;
        said connecting member portion having at least one longitudinal groove adapted to receive one of said clamping members prior to said connecting member portion being inserted into said outermost terminal end, whereby said clamping member operates to wedgingly secure said connecting member portion within its associated said outermost terminal end, without any fastening elements being visible an integrally floor plate at a lower portion thereof; and
        a strip plate adapted to be secured to said outer body surface in a manner so as to overlay a portion of said floor plate, to thereby clamp said floor plate to said outer body surface.

8. The roof rail of claim 7, wherein said connecting member portion has an annular shoulder adapted to abut an edge of its associated said outermost terminal end of said rail portion.

9. The roof rail of claim 7, wherein said connecting member portion of said end support comprises at least one longitudinal groove spaced circumferentially for receiving a clamping member.

10. The roof rail of claim 7, wherein said clamping member comprises a dowel member.

11. The roof rail of claim 7, wherein said strip plate includes a step for engaging said floor plate; and
    wherein said strip plate is of dimensions permitting it to be disposed within a hollow interior area of said end support so as to be hidden from view once said end support is secured to said outer body surface.

12. The roof rail of claim 7, wherein said end support further comprises an independent insert shaped so as to engage within a hollow interior area of said end support; and
    a fastening member adapted to secure said insert to said outer body surface.

13. The apparatus of claim 7, wherein said rail portion and said end support are made from the same material.

* * * * *